United States Patent
Georges

(10) Patent No.: US 8,153,718 B2
(45) Date of Patent: *Apr. 10, 2012

(54) HEAT-VULCANIZABLE POLYORGANOSILOXANE COMPOSITIONS AND ELECTRIC WIRES/CABLES PRODUCED THEREFROM

(75) Inventor: Catherine Georges, Saint Genis-les-Ollieres (FR)

(73) Assignee: Bluestar Silicones France, Lyon Cedex (FR)

( * ) Notice: Subject to any disclaimer, the term of this patent is extended or adjusted under 35 U.S.C. 154(b) by 118 days.

This patent is subject to a terminal disclaimer.

(21) Appl. No.: 12/519,302

(22) PCT Filed: Dec. 12, 2007

(86) PCT No.: PCT/FR2007/002042
§ 371 (c)(1),
(2), (4) Date: Dec. 22, 2009

(87) PCT Pub. No.: WO2008/087283
PCT Pub. Date: Jul. 24, 2008

(65) Prior Publication Data
US 2010/0105823 A1  Apr. 29, 2010

(30) Foreign Application Priority Data

Dec. 14, 2006 (FR) .................................. 06 10905

(51) Int. Cl.
*C08K 3/22* (2006.01)
(52) U.S. Cl. .......... 524/432; 524/433; 524/492; 524/493
(58) Field of Classification Search .................. 524/432, 524/433, 492, 493
See application file for complete search history.

(56) References Cited

U.S. PATENT DOCUMENTS

| 5,256,486 A | 10/1993 | Ariagno et al. |
| 2007/0244288 A1 * | 10/2007 | Tonge .............................. 528/25 |

FOREIGN PATENT DOCUMENTS

| EP | 0467800 B1 | 1/1992 |
| EP | 0558385 A1 | 9/1993 |
| WO | WO 01/34696 A1 | 5/2001 |
| WO | WO 01/34705 A1 | 5/2001 |
| WO | WO 2004/064081 A1 | 7/2004 |

* cited by examiner

*Primary Examiner* — Peter Szekely
(74) *Attorney, Agent, or Firm* — SNR Denton

(57) ABSTRACT

Polyorganosiloxane compositions heat-vulcanizable into silicone elastomers are useful in the field of electric wire or cable production via vulcanization employing salt baths.

14 Claims, No Drawings

HEAT-VULCANIZABLE POLYORGANOSILOXANE COMPOSITIONS AND ELECTRIC WIRES/CABLES PRODUCED THEREFROM

CROSS-REFERENCE TO PRIORITY/PCT APPLICATIONS

This application claims priority under 35 U.S.C. §119 of FR 0610905, filed Dec. 14, 2006, and is a continuation/national phase of PCT/FR 2007/002042, filed Dec. 12, 2007 and designating the United States (published in the French language on Jul. 24, 2008, as WO 2008/087283 A1; the title and abstract were also published in English), each hereby expressly incorporated by reference in its entirety and each assigned to the assignee hereof.

The present invention relates to hot-vulcanizable polyorganosiloxane compositions that may be hot-vulcanized into silicone elastomers, that is to say that are vulcanizable at material temperatures generally between 100° C. and 200° C. and, as required, extend to 250° C.

The invention also relates to the use of these compositions notably for the production, by extrusion, of primary envelopes or insulators entering into the composition of electric wires or cables protected against fire.

The expression "electric wires or cables protected against fire" is understood as definition of electric wires or cables that must guarantee high-quality behavior in fire, at least in terms of ash cohesion and fume opacity. The characteristics that electric wires or cables protected against fire should exhibit are the subject of legal regulations in many countries and rigorous standards have been established.

An electric cable consists, according to the known prior art, of one or more monoconductors (generally based on Cu or Al), each of these conductors being protected by a primary envelope or insulator made of one or more concentric layers based on a silicone elastomer. One or more filling elements and/or one or more reinforcing elements based notably on glass fibers or mineral fibers are provided around this envelope or these envelopes (in the case of a cable with several monoconductors). Outer sheathing is then provided that may comprise one or more sheaths. In the case of an electric cable with several monoconductors, the filling element or elements and the reinforcing element or elements that are disposed around the monoconductors (each fitted with its primary insulator) constitute(s) an envelope common to all the monoconductors. Although the silicone entering into the composition of the cables is essentially the material constituting the primary insulator or insulators, it may also be present in varying proportions: in the filling element or elements and/or the reinforcing element or elements (constituting the common envelope in the case of a cable with several monoconductors); and/or in the outer sheath or sheaths.

The number of concentric layers based on silicone elastomer, constituting the primary envelope or insulator of each monoconductor, and the thickness of the wall of each layer will depend essentially on requirements imposed for maintaining functioning according to the provisions of the standards. Generally, it is desirable to obtain such functioning by means of the use of one or two layers, each having in a suitable manner a thickness equal to at least 0.5 mm and preferably at least 0.8 mm.

An important standard relating to fire resistance tests that must be satisfied is international standard CEI 1034, parts 1 and 2 (CEI is an abbreviation of the expression: Commission Electrotechnique Internationale), which relates to measurements of the opacity of fumes discharged by burning electric cables under defined conditions. In this test, the light transmission is measured in a small 27 $m^3$ chamber obscured by the fumes produced by burning sections of cables under the action of an alcohol flame installed under defined conditions.

Polyorganosiloxane compositions that may be hot-vulcanized into silicone elastomers are already very widely used in cable making and for the production of power cable accessories, on account of their excellent dielectric properties, their thermal stability at low and high temperatures, their resistance to atmospheric or environmental conditions in use and their elasticity.

They are generally crosslinked, in particular with the aid of a crosslinking peroxide. Up to now, many peroxides used have not allowed a cable to be prepared by an extrusion method or by coextrusion since the temperature of such an operation is often of the order of 100 to 120° C., thus bringing about premature thermohardening of the formulation. Some organic peroxides, in particular aralkyl peroxides such as for example dicumyl peroxide (bis(1-methyl-1-phenylethyl peroxide)), make it possible to carry out this extrusion or coextrusion without premature thermohardening ("scorching" is spoken of). However, the use of such a type of peroxide presents the disadvantage of releasing, by thermal decomposition of the catalyst, and in particular in the range of temperatures that are of interest from the industrial point of view, very volatile gaseous products that give rise to extrusion faults and porosity in the crosslinked silicone elastomer around the conductive material during vulcanization in a salt bath.

Polyorganosiloxane compositions comprise aralkyl-peroxides that are hot-vulcanizable into silicone elastomers provided hitherto for the electric cable industry, which are not totally satisfactory, notably as regards the preparation and application of such compositions in a method for preparing a cable by extrusion (or coextrusion) and with vulcanization in a salt bath.

A considerable need therefore exists in the electric cable industry to overcome these porosity problems when use is made of a hot-vulcanizable silicone composition catalyzed by aralkyl-peroxides, such as for example dicumyl peroxide, in a vulcanization method using a salt bath.

One object of the present invention is the development of hot-vulcanizable polyorganosiloxane compositions which, while possessing good combustion resistance, possess good mechanical properties in the non-annealed state as in the annealed state, that do not exhibit degradation when an electric cable is produced after extrusion (or coextrusion with a thermoplastic polymer) and vulcanization in a salt bath. "Degradation" is understood to mean extrusion defects and/or porosity in the crosslinked silicone elastomer around the conductive material.

Polyorganosiloxane compositions have now been found, and this is what constitutes the first object of the present invention, that are catalyzed by aralkyl-peroxides, such as dicumyl peroxide, which are hot-vulcanizable into silicone elastomers that can be used in the field of the production of electric wires or cables, and that do not present degradation problems when an electric cable is produced by extrusion (or coextrusion with a thermoplastic polymer) and vulcanized in a salt bath.

Moreover, these compositions result in silicone elastomers having good mechanical properties and good behavior in fire and fume opacity.

More precisely, the present invention, taken as its first object, relates to a polyorganosiloxane composition that may be hot-vulcanized into a silicone elastomer, consisting of:

100 parts by weight of at least one polyorganosiloxane gum (a);
15 to 100 parts of a reinforcing filler or fillers (b);
0.2 to 8 parts of an aralkyl organic peroxide and preferably dicumyl peroxide;
0.2 to 10 parts of zinc oxide (d);
0.1 to 15 parts of calcium oxide (e);
0 to 15 parts of an auxiliary additive or additives (f);
0.0001 to 0.02 parts of ingredient (g) expressed by weight of platinum metal (elementary) (namely 10 ppm to 200 ppm);
10 to 100 parts of packing filler or fillers (i) and
0.5 to 10 parts of species (j) belonging to the wollastonite group.

Thus, the compositions according to the present invention comprise at least one polyorganosiloxane polymer (a) containing preferably 0 to 4% and even more preferably 0.01 to 3% by weight of a vinyl group. When these polyorganosiloxane polymers (a) have viscosities at 25° C. of between 50,000 and 1,000,000 mPa·s, they are called oils, but if their viscosity is greater than 1,000,000 mPa·s, they are then called gums. In the compositions according to the present invention, the polyorganosiloxane polymers may be oils or gums or mixtures thereof. These polyorganosiloxane polymers are linear polymers, of which the diorganopolysiloxane chain consists essentially of active groups of formula $R_2SiO$. This chain is blocked at each end by an active group of formula $R_3Si_{0.5}$ and/or a radical of formula OR'. In these formulae:

the symbols R, that are identical or different, represent monovalent hydrocarbon radicals such as alkyl radicals, for example methyl, ethyl, propyl, octyl, octadecyl etc, aryl radicals such as phenyl, tolyl, xylyl etc, aralkyl radicals such as benzyl, phenylethyl etc, cycloalkyl and cycloalkenyl radicals such as cyclohexyl, cycloheptyl, cyclohexenyl radicals etc, alkenyl radicals, for example vinyl, allyl etc radicals, alkaryl radicals, cyanoalkyl radicals such as a cyanoethyl radical etc, haloalkyl, haloalkenyl and haloaryl radicals such as chloromethyl, trifluoro-3,3,3 propyl, chlorophenyl, dibromophenyl or trifluoromethylphenyl radicals, the symbol R' represents a hydrogen atom, an alkyl radical having 1 to 4 carbon atoms or the betamethoxyethyl radical.

Preferably, at least 60% of the R groups represent methyl radicals. The presence, along the diorganopolysiloxane chain, of small quantities of active groups other than $R_2SiO$, for example active groups of formula $RSiO_{1.5}$ and/or $SiO_2$, is not however excluded in a proportion of at most 2% (these % expressing the number of T and/or Q active groups for 100 atoms of silicon).

As concrete examples of active groups of formulae $R_2SiO$ and $R_3SiO_{0.5}$, and radicals of formula OR', these may be cited of formulae:

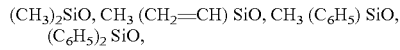

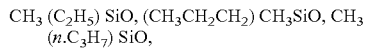

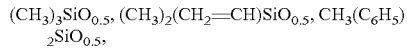

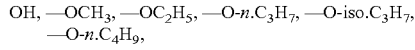

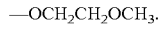

These oils and gums are marketed by silicone manufacturers or may be produced by operating according to already known techniques.

The reinforcing filler (b) consists of silica, alumina or a mixture of these two species. As silicas that may be used, fillers are aimed at that are characterized by a fine particle size, often less than or equal to 0.1 μm, and a high ratio of specific surface area to weight, generally comprised within a range of 50 square meters per gram and more than 300 square meters per gram. Silicas of this type are commercially available products and are well known in the art of silicone rubber production. These silicas may be prepared pyrogenically (silicas called combustion or fumed silicas) or by wet methods (precipitated silicas) and may be treated or untreated by organosilicic compounds normally employed for this use. The chemical nature and preparation method are not important for the purposes of the present invention, provided that the silica is capable of exerting a reinforcing action in the finished elastomer. Cuts of various silicas may of course also be used. As an alumina that may be used, a highly dispersible alumina is advantageously employed, doped or not in a known manner. Cuts of various aluminas may of course also be used. As non-limiting examples of such aluminas, mention may be made of A 125, CR 125 and D 65CR aluminas from the Baïkowski Company. Preferably, the reinforcing filler used is a combustion silica, taken alone or mixed with alumina.

As regards the aralkyl organic peroxide (c), this may thus consist for example of ditertiobutyl peroxide or dicumyl peroxide.

According to a preferred method, the aralkyl organic peroxide (c) is dicumyl peroxide.

The choice of aralkyl organic peroxide (c) will depend in practice on the process employed to vulcanize the elastomer.

The zinc oxide that constitutes ingredient (d) of compositions according to the present invention is a white or slightly yellowish powder.

Platinum, ingredient (g), may be in the form of metallic platinum (elementary); or in the form notably of chloroplatinic acid (for example hexachloroplatinic acid $H_2PtCl_6$); or in the form of platinum complexes and organic products, such as notably platinum complexes and vinyl organosiloxanes (for example the Karstedt complex), complexes such as those of formula $(PtCl_2, olefin)_2$ and $H(PtCl_3, olefin)$ where olefin represents ethylene, propylene, butylene, cyclohexene or styrene and complexes of platinum chloride and cyclopropane.

The packing filler (i) is more generally a crystalline silica. Such a filler often has a particle size greater than 0.1 μm. These fillers (i) are represented more specially by ground quartz and diatomaceous silicas. Cuts of various crystalline silicas may of course also be used. Preferably, the packing filler (i) is a ground quartz.

The compositions according to the present invention also contain, as an obligatory ingredient, at least one mineral species (j) belonging to the wollastonite group. The wollastonite group comprises the following mineral species: calcium metasilicate ($CaSiO_3$) or wollastonite; the mixed metasilicate of calcium and sodium ($NaCa_2HSi_3O_9$) or pectolite; the mixed metasilicate of calcium and manganese [$CaMn(SiO_3)_2$] or bustamite. A mixture of these various species may of course be used. Preferably, the ingredient (j) used is a wollastonite. Wollastonite exists in two forms: wollastonite itself, which chemists denote by α-$CaSiO_3$, that is found normally in the natural state; and pseudo-wollastonite or β-$CaSiO_3$. More preferably, α-$CaSiO_3$ wollastonite is used.

In addition to the obligatory ingredients (a), (b), (c), (d), (e), (g), (i) and (j) specified above, the composition according to the present invention may optionally contain in addition one or more auxiliary additives (f), such as notably: at least one product called "an antistructure product" (f1); and/or at least one polysiloxane resin (f2); and/or at least one stabilizing agent (f3); and/or at least one coupling agent (f4); and/or at least one pigment (f5) for producing colored wires and cables and/or at least one boron-based compound (f6).

For preparing compositions according to the invention, the various ingredients are intimately mixed by means of devices that are well known in the silicone elastomer industry, these being incorporated in any order. It is however advantageous first of all to disperse the constituent ingredients in the polyorganosiloxane(s) (a), in the order for example given hereinafter: possible additive(s) (f3) and (f6), then the packing filler(s) (i), then the species of the wollastonite group (j), then zinc oxide (d), then ingredient (g) based on Pt, and then the possible additive or additives (f1), (f2) and (f4), and then reinforcing filler(s) (b) in several additions; and to this mixture the desired quantity of catalyst (c) and possible additive (f5) is then added.

In addition, the invention, as a second object, relates to the use of polyorganosiloxane compositions that have just been described for producing, notably, primary envelopes or insulators for monoconductors entering into the composition of electric wires or cables protected against fire.

The invention relates, as a third object, to a silicone elastomer capable of being obtained by crosslinking a hot-vulcanizable polyorganosiloxane composition according to the invention and as defined above.

As its final object, the invention relates to the use of a composition according to the invention as defined above for producing a primary envelope or insulator for a monoconductor or monoconductors entering into the composition of electric wires or cables protected against fire, which consists of depositing said composition around each monoconductor, or extruding or coextruding with a thermoplastic polymer and then of crosslinking into a silicone elastomer in a salt bath at a material temperature extending from 100° C. to 200° C.

Within the framework of such a use, deposition of a composition according to the invention around each monoconductor may be carried out according to usual methods, notably by extrusion methods. The deposit thus obtained is then crosslinked by heating in a salt bath in order to lead to the formation of the primary insulator made of silicone elastomer. The duration of heating obviously varies with the temperature of the material. It is generally of the order of a few to several minutes at 100° C.-120° C. and of a few seconds at 180-200° C. It is possible to deposit several layers conjointly with the aid of extrusion in tandem equipped for example with a crosshead or by co-extrusion.

Other details or advantages of the invention will become more clearly apparent in the light of the examples given below solely by way of indication.

EXAMPLE 1 AND COMPARATIVE EXAMPLE A

1) Comparative Example A patent application EP 1238014:

The following were mixed for two hours at ambient temperature (23° C.) in a Z-arm dough mixer:
- 33.0 parts of a polyorganosiloxane a) that is a poly(dimethyl)(methylvinyl)siloxane blocked at each of its two ends by a trimethylsiloxy active group, containing in the chain 720 ppm of Vi groups, having a viscosity of 20 million mPa·s at 25° C.;
- 67.0 parts of a polyorganosiloxane a) that is a polydimethylsiloxane blocked at each of its two ends by a dimethylvinylsiloxy active group, containing 120 ppm of Vi groups, having a viscosity of 20 million mPa·s at 25° C.;
- 0.27 parts of calcium oxide f3);
- 0.049 parts of iron octoate f3);
- 2.96 parts of Ce(OH)$_4$ f3);
- 79.1 parts of ground quartz i), marketed by the Sifraco Company (Paris, France) under the designation E600;
- 3.30 parts of wollastonite α-CaSiO$_3$ j);
- 9.95 parts of mica of the muscovite type d);
- 4.85 parts of zinc oxide e);
- 0.0061 parts of platinum metal g), provided in the form of a solution in divinyltetramethyldisiloxane of a platinum complex having 10% by weight of platinum liganded with divinyltetramethyldisiloxane (Karstedt complex);
- 3.64 parts of combustion TiO$_2$ h);
- 2.91 parts of a polydimethylsiloxane oil f1) blocked at its two ends by dimethylhydroxysiloxy active groups, containing 9% by weight of OH, with a viscosity of 50 mPa·s at 25° C.;
- 1.70 parts of a poly(methylvinyl)siloxane oil f1) blocked at its two ends by methylvinylhydroxy-siloxy active groups, containing 9% by weight of OH and, in the chain, 3% by weight of Vi groups, with a viscosity of 25 mPa·s at 25° C.;
- 18.44 parts of D4 (octamethylcyclotetrasiloxane) treated combustion silica b) with a specific surface area of 200 m$^2$/g;
- 14.56 parts of a combustion silica b) with a specific surface area of 150 m$^2$/g.

The mixture obtained above was then worked in a 2-cylinder blender and there was added thereto:
- 3 parts of 2,4-dichlorobenzoyl peroxide c).

(2i) A fraction of the homogeneous mass obtained in the blender was used for producing an electric cable. Production of this cable was with a standard construction consisting of producing a cable comprising a copper monoconductor around which a primary envelope or insulator was extruded made of a silicone elastomer+a thermoplastic polymer that was then vulcanized in a salt bath by an operating procedure known to a person skilled in the art.

The cable obtained had porosities as well as extrusion defects.

2) Composition According to the Invention (all parts are given by weight):

The following were blended for 2 hours in a Z-arm dough blender at ambient temperature (23° C.), for 100 parts by weight of composition:
- 45.08 parts by weight of a polyorganosiloxane (a1) that is a poly(dimethyl)(methylvinyl)siloxane blocked at each of its two ends by a trimethylsiloxy active group, containing in the chain 360 ppm of vinyl groups, having a viscosity of 20 million mPa·s at 25° C.;
- 4.53 parts of a polyorganosiloxane (a2) that is a polydimethylsiloxane blocked at each of its two ends by a dimethylvinylsiloxy active group, containing 120 ppm of Vi groups, having a viscosity of 20 million mPa·s at 25° C.;
- 3.03 parts of calcium oxide (e);
- 0.018 parts of iron octoate (f3);
- 17.65 parts of ground quartz (i), marketed by the Sifraco Company (Paris, France) under the designation E600;
- 2.26 parts of wollastonite α-CaSiO$_3$ (j);
- 1.81 parts of zinc oxide (d);

0.68 parts of a solution of divinyltetra-methyldisiloxane+a platinum complex having 10% by weight of platinum liganded with divinyltetramethyldisiloxane (Karstedt complex), equivalent to 0.001 parts of platinum metal (g);

1.76 parts of a polydimethylsiloxane oil (f1) blocked at its two ends by dimethylhydroxysiloxy active groups, containing 9% by weight of OH, with a viscosity of 50 mPa·s at 25° C.;

1.32 parts of a poly(methylvinyl)siloxane oil (f2) blocked at both of its ends by methylvinylhydroxysiloxy active groups, containing 9% by weight of OH and, in the chain, 3% by weight of Vi groups, with a viscosity of 25 mPa·s at 25° C.;

13.68 parts of D4 (octamethylcyclotetrasiloxane) treated combustion silica (b1) with a specific surface area of 200 $m^2/g$;

7.08 parts of a combustion silica (b2) with a specific surface area of 150 $m^2/g$.

The mixture obtained above was then worked in a 2-cylinder blender and the following was added thereto:

1.1 parts of Perkadox-BC-FF® (dicumyl peroxide or bis (1-methyl-1-phenylethyl) peroxide.

3. Characterization of the Composition (i) A fraction of the homogeneous mass obtained in the blender was used for measuring the mechanical properties of the silicone elastomer resulting from hot-vulcanization of the polyorganosiloxane composition. In order to do this, the homogeneous mass fraction selected for this purpose was then vulcanized for 8 minutes at 115° C., operating in a suitable mold enabling 2 mm thick sheets to be obtained. In this way, sheets were obtained in the non-annealed state (NA). A fraction of the sheets was then subjected to annealing for 4 h at 200° C. and ageing for 10 days at 200° C. Samples were then taken from all these sheets and the following properties measured:

Shore A hardness (SAH) according to standard DIN 53505.

The breaking strength (B/S) in MPa according to standard AFNOR NF T 46002

Elongation at break (E/B) in % according to the preceding standard

Elastic modulus (EM) at 100% in MPa according to the preceding standard.

The results are given in the following table 1:

|  | Initial | Annealing 4 h at 200° C. | Ageing 10 days at 200° C. |
|---|---|---|---|
| SAH | 68 | 70 | 73 |
| B/S (MPa) | 7.7 | 7.8 | 7 |
| E/B (%) | 270 | 244 | 197 |
| EM (MPa) | 3.1 | 3.5 | 4.1 |

(2i) Another fraction of the homogeneous mass obtained in the blender was employed for the production of an electric cable. Production of the cable was by a standard construction consisting of producing a cable comprising copper monoconductor around which a primary envelope or insulator was coextruded made of silicone elastomer+thermoplastic polymer that was then vulcanized in a salt bath by an operating procedure known to a person skilled in the art.

The cable obtained was without porosity and did not exhibit any extrusion defect, satisfying fire standard IEC 60331 as well as those for fume opacity (IEC 61034 and ES 7622). In addition, the silicone composition and silicone insulator satisfied standard NFC 32102 concerning mechanical properties before and after ageing for 10 days at 200° C.

The invention claimed is:

1. A polyorganosiloxane composition heat-vulcanizable into silicone elastomeric state, consisting essentially of:
   100 parts by weight of at least one polyorganosiloxane gum (a);
   15 to 100 parts of a reinforcing filler or fillers (b);
   0.2 to 8 parts of an organic peroxide (c);
   0.2 to 10 parts of zinc oxide (d);
   0.1 to 15 parts of calcium oxide (e);
   0 to 15 parts of an auxiliary additive or additives (f);
   0.0001 to 0.02 parts of a platinum ingredient (g) expressed by weight of platinum metal;
   10 to 100 parts of packing filler or fillers (i); and
   0.5 to 10 parts of wollastonite group (j).

2. The polyorganosiloxane composition as defined by claim 1, said ingredient (a) comprising at least one polyorganosiloxane polymer containing 0 to 4% by weight of vinyl groups and having a viscosity greater than 1 million mPa.s at 25° C.

3. The polyorganosiloxane composition as defined by claim 1, said ingredient (b) comprising silica, alumina or mixture thereof.

4. The polyorganosiloxane composition as defined by claim 1, said ingredient (i) comprising at least one crystalline silica.

5. The polyorganosiloxane composition as defined by claim 1, said ingredient (j) comprising at least one species selected from the group consisting of calcium metasilicate ($CaSiO_3$) or wollastonite, the mixed metasilicate of calcium and sodium ($NaCa_2HSi_3O_9$) or pectolite, and the mixed metasilicate of calcium and manganese $[CaMn(SiO_3)_2]$ or bustamite.

6. The polyorganosiloxane composition as defined by claim 1, containing an ingredient (f) which comprises at least one "anti-structure" product (f1); and/or at least one polysiloxane resin (f2); and/or at least one stabilizing agent (f3); and/or at least one coupling agent (f4); and/or at least one colored pigment (f5); and/or at least one boron-based compound (f6).

7. A silicone elastomer which comprises a crosslinked and heat-vulcanized polyorganosiloxane composition as defined by claim 1.

8. A method for producing a primary envelope or insulator for a monoconductor or monoconductors, which comprises depositing the polyorganosiloxane composition as defined by claim 1 around each monoconductor, extruding or coextruding same with a thermoplastic polymer and then crosslinking same into a silicone elastomer in a salt bath at a material temperature ranging from 100° C. to 200° C.

9. The polyorganosiloxane composition as defined by claim 1, said ingredient (c) comprising an aralkyl organic peroxide.

10. The polyorganosiloxane composition as defined by claim 1, said ingredient (c) comprising dicumyl peroxide.

11. A primary envelope or insulator for a monoconductor which comprises the polyorganosiloxane composition as defined by claim 1, in crosslinked and heat-vulcanized state.

12. The composition of claim 1, wherein the platinum ingredient (g), is in the form of metallic platinum (elementary); a chloroplatinic acid, or a platinum complex.

13. The composition of claim 12, wherein the platinum ingredient (g) is hexachloroplatinic acid ($H_2PtCl_6$); or complex of platinum and at least one vinyl organosiloxane.

14. The composition of claim 13, wherein the complex of platinum and at least one vinyl organosiloxane is the Karstedt complex, a complex of formula $(PtCl_2, olefin)_2$ or a complex of formula $H(PtCl_3, olefin)$, where olefin represents ethylene, propylene, butylene, cyclohexene or styrene and complexes of platinum chloride and cyclopropane.

* * * * *